June 14, 1960 P. E. GIRTON Re. 24,838

PRIMARY DISCONNECT PLUG FOR WELDING TRANSFORMERS

Original Filed Aug. 13, 1953 3 Sheets-Sheet 1

INVENTOR.
Preston E. Girton
BY
Price and Heneveld
ATTORNEYS

PRIMARY DISCONNECT PLUG FOR WELDING TRANSFORMERS

Original Filed Aug. 13, 1953 3 Sheets-Sheet 2

INVENTOR.
Preston E. Girton
BY
Price and Heneveld
ATTORNEYS

PRIMARY DISCONNECT PLUG FOR WELDING TRANSFORMERS

Original Filed Aug. 13, 1953 3 Sheets-Sheet 3

INVENTOR.
Preston E. Girton
BY
Price and Berneld
ATTORNEYS

United States Patent Office

Re. 24,838

Reissued June 14, 1960

24,838

PRIMARY DISCONNECT PLUG FOR WELDING TRANSFORMERS

Preston E. Girton, Grand Rapids, Mich., assignor to Kirkhof Manufacturing Corporation, Grand Rapids, Mich., a corporation of Michigan Original No. 2,778,001, dated Jan. 15, 1957, Ser. No. 374,062, Aug. 13, 1953. Application for reissue Mar. 27, 1957, Ser. No. 649,267

5 Claims. (Cl. 219—116)

Matter enclosed in heavy brackets [ ] appears in the original patent but forms no part of this reissue specification; matter printed in italics indicates the additions made by reissue.

This invention is concerned with welding transformers and, more particularly, with a novel construction and arrangement of a disconnecting plug for the primary circuits of such transformers.

At times transformers get out of order due to the service to which they are subjected and for other reasons, and it is necessary to repair them. This, in practice, ordinarily requires that the current from the secondary circuit of the transformer which is supplied to welding machines and the like is interrupted for the length of time required to repair or recondition the transformer.

With my invention, a transformer when it is out of condition can be readily removed, replaced by another or spare transformer with only a momentary interruption of the manufacturing process or the like which is being carried on. It is merely necessary to remove the connecting plug of my invention, which is in the primary circuit of the transformer, unbolt the transformer from its support and take it to a place of repair, substituting for the removed transformer one of the same kind and insert the plug in the transformer which has replaced the first one, all being done in a short space of time.

An understanding of the invention for the attainment of the ends described may be had from the following description taken in connection with the accompanying drawings, in which, Fig. 1 is a perspective view of the cover plate for a welding transformer on which the disconnect plug of my invention is mounted.

Figure 4:
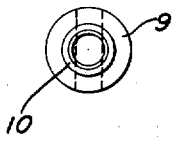
Figures 5, 6:
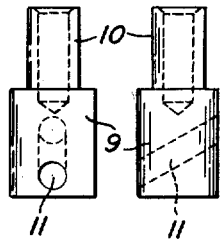

Figs. 4, 5 and 6 are, respectively, an end elevation and two side elevations in planes at right angles to each other of the terminals with which the input wires carrying the electric current to the transformer are connected adjacent one end, the opposite ends thereof having detachable connection with spaced posts which are in electrical connection with the ends of the primary winding of the transformer.

Figure 7:
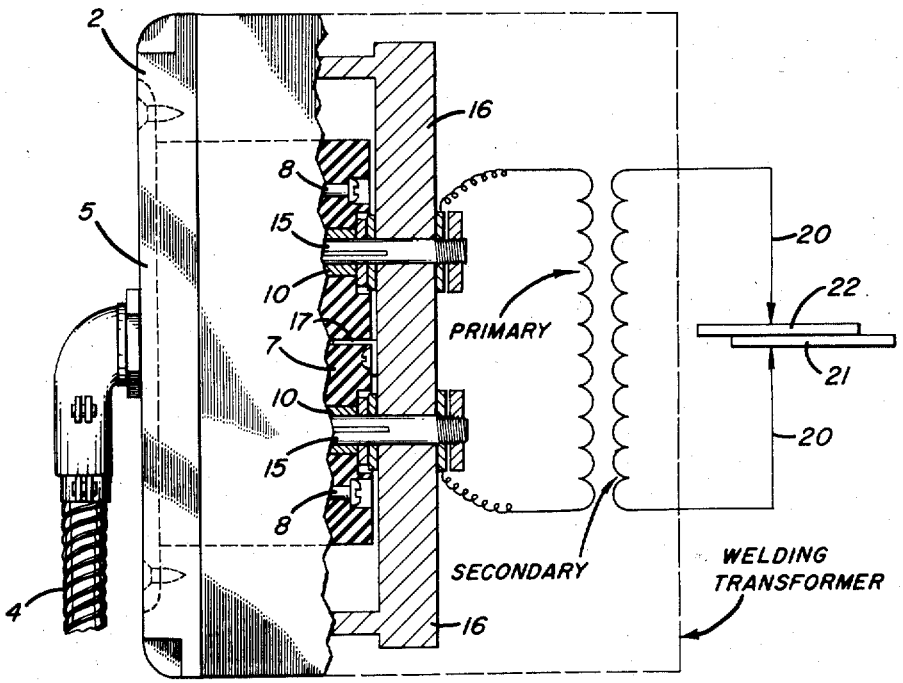

*Fig. 7 is a side elevational, partially sectioned view of the transformer cover schematically illustrating the other components of the transformer.*

The cover for the transformer housing includes a generally box-like frame 1, the outer end of which is closed by the cover proper 2, which is attached by screws, and on which the transformer control lever 3 is mounted for manual operation. Such environment to which my invention is applied is old and the detail respecting the current control need not be entered into. The wires from the main electric current supply extend to the cover through an armor 4, an end of which is connected with an elongated plate 5 at a central opening 5a therein. The wires passing through the opening 5a lead to the body of the plug which is secured to the plate 5. It is to be understood that the cover member 2 has an elongated opening over which the plate 5 extends, said plate 5 being detachably secured by screws near the ends of plate 5, as shown. The plate 5 perferably is flush with the outer side of the cover plate 2.

From the inner side of the plate 5 toward each end thereof an interiorly bored and threaded boss 6 extends. The body 7 of the plug is of insulating material, such as a suitable plastic molded to form, and which has openings receiving the bosses 6. Elongated screws 8 pass from the inner end of the plug to and are threaded into the inner end of the bosses 6 to secure the plug body 7 firmly in place.

Figure 1:
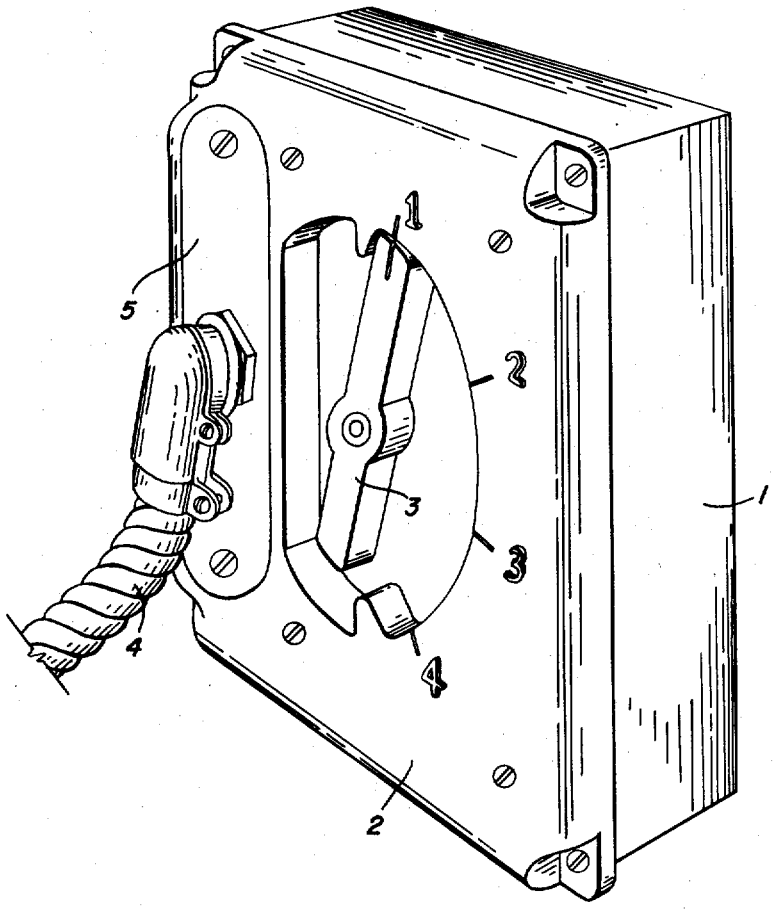
Figure 2:
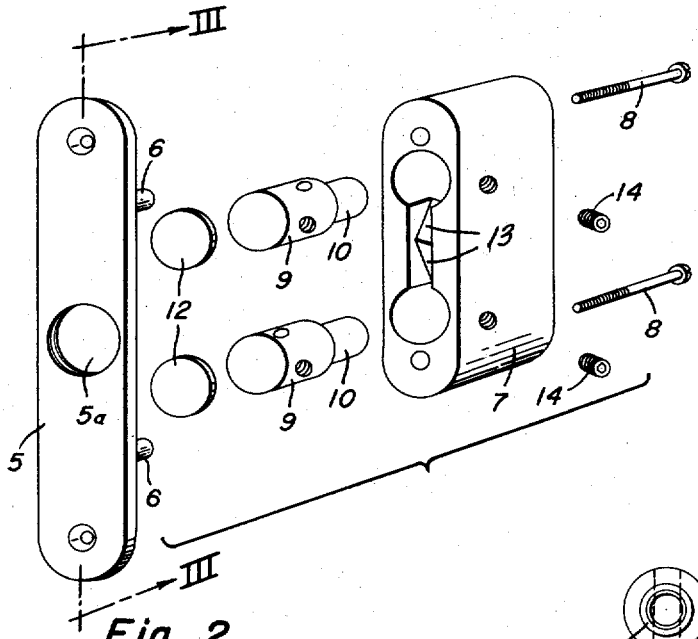
Fig. 2 is an exploded view showing the parts of the disconnect plug separate and disassembled from each other.
Figure 3:
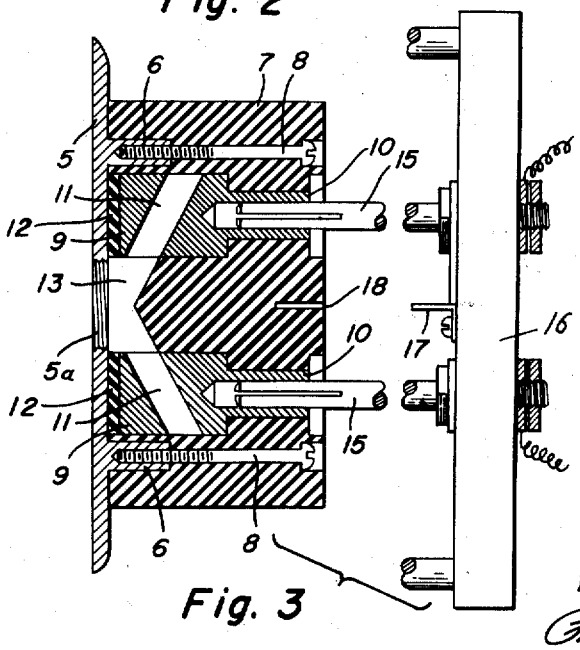
Fig. 3 is a vertical section through the disconnect plug of my invention, showing it operatively connected with the posts of *the* primary circuit of the transformer, the plane of the section being substantially that indicated in line III—III of Fig. 2.

The body 7 is also molded to receive two spaced terminals, one at each side of the opening 5a in the plate 5. Such terminal contacts include a cylindrical outer portion 9, from which an integral socket member 10, also of cylindrical form but of shorter diameter, extends. The larger portions 9 have generally transverse openings 11 therethrough which diverge from each other toward the inner end of the plug as shown in Fig. 3, into which the main current wires coming thereto through the armor 4 are received and securely connected one in each opening 11. Such terminals are inserted in place before the body 7 of the plug is connected to the plate 5, and at the outer end of each thereof a disk 12 of insulating material is located so that such terminals to the current supply wires are wholly insulated from all other parts of the plug. The outer side of the plug 7, as shown in Fig. 2, is recessed as at 13 for the ready passage of the current wires to the openings 11 in which they are inserted. Set screws 14 may be threaded through the sides of the body 7 to bind the ends of the current carrying wires securely in place.

Two connecting posts 15 are adapted to be inserted into the reduced portions 10 of the terminals described. Such posts are mounted upon a bar 16 and have the proper electrical connection (*Fig. 7*) with the ends of the primary winding of the transformer *which induces current in the secondary, such currents flowing through the electrodes 20 and work pieces 21 and 22 to produce a weld as is well known in the welding art.* When the plugs are pushed into place over such posts, an arc barrier 17 of insulating material secured to bar 16 enters a receiving slot at 18 therefor at the inner end of the body 7 of the plug, acting to prevent arcing between the posts 15.

Whenever a transformer which is in use requires repair or reconditioning, the screws which attach the plate 5 to the cover plate 2 are removed whereupon the plug is very easily pulled outward, disconnecting from the posts 15. The transformer as a whole is then disconnected from its support and the secondary winding disconnected from the current carrying wires leading therefrom. A spare transformer is then put in place and secured and the plug very quickly inserted at the same opening in the cover plate 2 of the new transformer, and is secured in place by the screws used for such purpose. The transformer needing repair, reconditioning and the like may be taken to any place of repair but none of the machines which are supplied with electric current from the transformer are idle during such time of repair or reconditioning.

The invention while of a relatively simple character is one of practical value. The invention is defined in the appended claims and is to be considered comprehensive of all forms of structure coming within their scope.

I claim:

1. A transformer cover having an elongated opening therethrough, an elongated plate detachably secured to said cover at and closing said opening, said plate adjacent each end having an interiorly threaded boss at its inner side extending inwardly at right angles to the plate, an elongated body of insulating material located at its outer end against the inner side of said plate, said bosses extending into the body, screws extending from the inner end of said body into said bosses, two terminals in said body, one adjacent to and insulated from each screw, insulating disks between said plate and the inner ends of said terminals, said body having a recess between and exposing the outer end portions of said terminals at adjacent sides thereof, and said plate having an opening therethrough in conjunction with said recess.

*2. A transformer cover having an elongated opening therethrough, an elongated plate detachably secured to said cover at and closing said opening, said plate adjacent each end having an interiorly threaded boss at its inner side extending inwardly at right angles to the plate, an elongated body of insulating material located at its outer end against the inner side of said plate, said bosses extending into the body, attachment means extending from the inner end of said body into said bosses, two terminals in said body insulated from said plate, said body having a recess between and exposing the outer end portions of said terminals at adjacent sides thereof, and said plate having an opening therethrough in conjunction with said recess.*

*3. A resistance welding transformer unit comprising a primary and secondary; an enclosure for said primary and secondary, said enclosure having an open end; electrode means extending from said enclosure and connected to said secondary for effecting a weld; a cover mounted over the open end of said enclosure, said cover having an elongated opening therethrough, an elongated plate detachably secured to said cover at and closing said opening, said plate adjacent each end having an interiorly threaded boss at its inner side extending inwardly at right angles to the plate, an elongated body of insulating material located at its outer end against the inner side of said plate, said bosses extending into the body, attachment means extending from the inner end of said body into said bosses, two terminals in said body insulated from plate, said body having a recess between and exposing the outer end portions of said terminals at adjacent sides thereof, and said plate having an opening therethrough in conjunction with said recess.*

*4. A resistance welding transformer unit comprising a primary and secondary; an enclosure for said primary and secondary, said enclosure having an open end; electrode means extending from said enclosure and connected to said secondary for effecting a weld; a cover mounted over the open end of said enclosure, said cover having an elonagted opening therethrough, an elongated plate detachably secured to said cover at and closing said opening, said plate adjacent each end having an interiorly threaded boss at its inner side extending inwardly at right angles to the plate, an elongated body of insulating material located at its outer end against the inner side of said plate, said bosses extending into the body, screws extending from the inner end of said body into said bosses, two terminals in said body, one adjacent to and insulated from each screw, insulating disks between said plate and the inner ends of said terminals, said body having a recess between and exposing the outer end portions of said terminals at adjacent sides thereof, and said plate having an opening therethrough in conjunction with said recess.*

*5. A resistance welding transformer unit comprising a primary and secondary; an enclosure for said primary and secondary, said enclosure having an open end; electrode means extending from said enclosure and connected to said secondary for effecting a weld; a cover mounted over the open end of said enclosure; a terminal support means mounted toward the innermost portion of said enclosure in spaced relationship from said cover; first terminal means mounted on said terminal support means and electrically connected to said primary; said cover having an opening aligned with said first terminal means; a plate detachably mounted on said cover over said opening; an elongated body of insulating material secured at its outer end to the inner side of said plate; second terminal means in said body; said body and plate having communicant openings therethrough leading to the said second terminal means; an electrical current conductor extending from the outside of said enclosure through said communicant openings and secured to said second terminal means; and means for detachably securing said plate to said cover whereby the plate, elongated body of insulating material with said second terminal means therein, and said electrical current conductor can be completely disconnected from the remainder of the welding transformer facilitating easy replacement of the same.*

References Cited in the file of this patent or the original patent

UNITED STATES PATENTS

| | | |
|---|---|---|
| 754,863 | Goodridge | Mar. 15, 1904 |
| 1,157,026 | Meschenmoser | Oct. 19, 1915 |
| 1,160,187 | Meschenmoser | Nov. 16, 1915 |
| 1,692,251 | D'Olier | Nov. 20, 1928 |
| 2,269,314 | MacDonald | Jan. 6, 1942 |
| 2,556,235 | Strickland | June 12, 1951 |
| 2,752,413 | Junkins | June 26, 1956 |
| 2,778,001 | Girton | Jan. 15, 1957 |